United States Patent [19]

Sezai

[11] Patent Number: 5,485,162
[45] Date of Patent: Jan. 16, 1996

[54] METHOD OF PERFORMING BEAM COMPRESSION PROCESS ON ANTENNA PATTERN OF RADAR

[75] Inventor: Toshihiro Sezai, Tokyo, Japan

[73] Assignee: National Space Development Agency of Japan, Tokyo, Japan

[21] Appl. No.: 293,888

[22] Filed: Aug. 22, 1994

[30] Foreign Application Priority Data

Sep. 13, 1993 [JP] Japan .................................. 5-249690

[51] Int. Cl.⁶ .................................................. G01S 3/16
[52] U.S. Cl. .......................................... 342/378; 342/382
[58] Field of Search ................................... 342/378, 382, 342/372

[56] References Cited

U.S. PATENT DOCUMENTS 4,010,469  3/1977  Marcum ................................ 343/18 E
5,296,864  3/1994  Sezai .................................... 342/382

FOREIGN PATENT DOCUMENTS 0540249  5/1993  European Pat. Off. .

Primary Examiner—Thomas H. Tarcza
Assistant Examiner—Dao L. Phan
Attorney, Agent, or Firm—Armstrong, Westerman, Hattori, McLeland & Naughton

[57] ABSTRACT

An antenna system comprising two similar antennas with a monopulse feed system is scanned while transmitting in-phase radio waves from the two antennas. Reflected radio waves are received by the two antennas and fed to a hybrid circuit which in turn produces a sum signal Σ and a difference signal Δ. After detection is performed by a detector, a signal processing unit performs double differential processing on the sum signal Σ and the differential signal Δ. In this processing step, the sum signal is output only if the double differential coefficient of said sum signal is equal to or less than a predefined positive real number value and if the double differential coefficient of said difference signal is equal to or greater than a predefined negative real number value, and a zero signal is output in any other cases. Thus, the beam width of an antenna pattern is compressed without missing a necessary output signal.

1 Claim, 8 Drawing Sheets

METHOD OF PERFORMING BEAM COMPRESSION PROCESS ON ANTENNA PATTERN OF RADAR

BACKGROUND OF THE INVENTION

1. Field of the Invention

The present invention relates to a method of performing beam compression of an antenna pattern, which can provide better performances in the beam compression process of an antenna pattern of a radar including a monopulse power feed system.

2. Description of the Related Art

In general, a beam width is one of indexes representing the performance of an antenna pattern of a receiving antenna or other type antennas. A narrower beam width in an antenna pattern will give a better performance. However, there is a relationship of inverse proportion between a beam-width and the size (length) of an antenna. Therefore, if the beam width is reduced, then the size of the antenna will be increased. Conversely, if the dimension of the antenna is reduced, then the beam width will be broadened.

For example, in an antenna for a radar system, if it is desired to double the ability or the resolution to discriminate objects, it is required to halve the beam width and thus it is required to double the size of the antenna. The doubling of the size leads to not only a larger occupied region but also various disadvantages such as an increase in the weight of the antenna and in the size of a structure for supporting the antenna. Conversely, if the size of an antenna is halved, then the beam width will be doubled and the discrimination ability will be degraded by a factor of two.

It is well known that there is such a conflicting relationship between a beam width and the size of an antenna. In most cases, an actual antenna has a limitation in the region it can occupy. Therefore, under these limited conditions, a certain degree of compromise associated with the beam width has to be made.

One known beam compression technique to alleviate the above-described problems is to employ two similar antennas with a monopulse power feed system so as to reduce the beam width by subtracting the difference signal pattern between the two antennas from the sum signal pattern of the two antennas. FIG. 1 is a schematic diagram illustrating a radar system which can perform the beam compression in such a manner described above. In this figure, reference numerals 101,101 designate a pair of antennas with a monopulse power feed system, wherein each antenna has a length of a, and the center-to-center distance between the antennas is d. Reference numeral 102 designates a power divider and reference numeral 103 designates a transmitting circuit. The transmitting circuit 103 generates the transmission power, which is fed in the same phase to the antennas 101 via the power divider 102. Reference numeral 104 designates a hybrid circuit which produces a sum signal $\Sigma$ and a difference signal $\Delta$ from receiving signals of the two antennas 101,101. Reference numeral 105 designates a detector for detecting the sum signal $\Sigma$ and the difference signal $\Delta$, and reference numeral 106 designates a differential amplifier which provides an antenna output signal by subtracting the difference signal $\Delta$ from the sum signal $\Sigma$.

In the radar system having the configuration described above, the differential amplifier 106 provides the antenna output signal produced by subtracting the difference signal $\Delta$ from the sum signal $\Sigma$. One aspect of the antenna output signal is shown in FIG. 2 in a general representing manner of a power pattern associated with beam compression. That is, in FIG. 2, the broken line represents the sum signal $\Sigma$ of the receiving signals of the two antennas, and the alternate long and short dash line represents the difference signal $\Delta$. The solid line represents the output signal ($\Sigma-\Delta$) which is the difference between these two signals. As can be seen, the output signal shows a synthetic directional characteristic having a compressed beam width.

A radar system which performs beam compression according to a conventional technique as described above can provide a certain degree of beam compression. However, if there are a large number of scattering objects in a direction of radio wave radiation, the difference signal $\Delta$ will become small compared to the sum signal $\Sigma$. As a result, the final output signal value obtained by subtracting the difference signal $\Delta$ from the sum signal $\Sigma$ will have only a slight difference from the value of the sum signal $\Sigma$. This means that there is a problem that efficient effects of beam compression cannot be achieved.

To solve the above-described problem, the inventor of the present invention has proposed a method of compressing the beam width of an antenna pattern in U.S. patent application Ser. No. 08/209,901 (Japanese Patent Application No. 5-117575). In this previously proposed patent, the method for compressing the beam width of the antenna pattern of a radar system comprises the steps of: providing a radar antenna system comprising two similar antennas having a monopulse feed system; scanning the antenna system while transmitting radio waves from the two antennas of the antenna system in such a manner that both the radio waves transmitted from the respective antennas are in the same phase; receiving by the antenna system the radio waves which were transmitted from the antenna system and reflected by scattering objects and have finally come back; producing a sum signal and a difference signal of the received signals of the two antennas of the antenna system; and performing a signal processing comprising the steps of subtracting the difference signal from the sum signal and providing the resulting signal as a final antenna output signal; the method being characterized in that the above-described signal processing step further comprises the step of providing the final antenna output signal only if the receiving pattern waveform associated with the sum signal has an upwardly convex form, that is, the double differential coefficient of the receiving pattern waveform associated with the sum signal with respect to the scanning angle is negative and further if the receiving pattern waveform associated with the difference signal has a downwardly convex form, that is, the double differential coefficient of the receiving pattern waveform associated with the difference signal with respect to the scanning angle is positive, whereas providing a zero output signal if the above conditions are not satisfied.

In general, when objects to be observed are distributed discretely as in the case of a radar, the receiving pattern waveform has an upwardly convex form near an angle at which an object exists, whereas it does not have an upwardly convex form near angles at which no object exists.

In the case of a beam compression method for a radar antenna system employing two similar antennas with a monopulse feed system, in which the reduction in the beam width is achieved by means of a process using the sum signal and the difference signal of receiving signals of respective antennas wherein the beam compression process is carried out by subtracting the difference signal pattern from the sum signal pattern, the receiving pattern waveform associated with the sum signal has an upwardly convex form near an angle at which an object exists as represented by the broken line in FIG. 2. In contrast, however, the receiving pattern waveform associated with the difference signal has a downwardly convex form near an angle at which an object exists, and the waveform gradually changes to an upwardly convex form as the angle departs from that at which the object exist, as represented by the alternate long and short dash line in FIG. 2.

In the previous invention, therefore, only if the receiving pattern waveform associated with the sum signal has an upwardly convex form, that is, its double differential coefficient is negative, and further if the receiving pattern waveform associated with the difference signal has a downwardly convex form, that is, its double differential coefficient is positive, the difference signal is subtracted from the sum signal and the result is provided as the output signal, and a zero output signal is provided if the above conditions are not satisfied. Thus, the output signal is provided only in the regions where the receiving pattern waveform associated with the sum signal represented by the broken line in the power pattern of FIG. 2 has an upwardly convex form and the receiving pattern waveform associated with the difference signal represented by the alternate long and short dash line has a downwardly convex form. As a result, the output signal is provided in such a manner as represented by the solid line in FIG. 3, which shows a significant improvement of beam compression effect. In FIG. 3, the broken lines represent the regions where the receiving pattern waveform associated with the sum signal has an upwardly convex form, and the alternate long and short dash lines represent the regions where the receiving pattern waveform associated with the difference signal has a downwardly convex form.

In the above description with respect to the method of compressing the beam width of the antenna pattern according to the previous invention, it has been assumed that there is one scattering object within the range of the radio wave radiation. In practical situations, however, there are always different scattering objects having various sizes at various locations. In some cases, for example, if there is a small scattering object near a large scattering object, the receiving pattern waveform associated with the sum signal has an upwardly convex form near the angle at which the large scattering object exists, while it does not have an upwardly convex form near the angle at which the small scattering object exists. For example, if there are point scattering objects in the directions of −12°, −6°, 0°, 6°, and 12° wherein the scattering coefficient of the scattering object existing at −6° is 0.1, and the scattering coefficients of the other scattering objects are 1, then the power pattern of the sum signal is such as that shown in FIG. 4, and the power pattern of the difference signal is such as that shown in FIG. 5. As can be seen from FIG. 4, the power pattern of the sum signal does not have an upwardly convex form near the angle of −6° at which the small scattering object exists.

In such a case, the beam-width compression method according to the previous invention provides a zero output signal near the angle at which the small scattering object exists. This means that a zero output signal is provided even when there actually exist some scattering objects. That is, some necessary output signals are missed.

SUMMARY OF THE INVENTION

It is an object of the present invention to improve the above-described problem in the beam-width compression technique according to the previous invention. More specifically, it is an object of the present invention to provide a method of compressing the beam width of an antenna pattern of a radar system, which can provide better beam compression without missing output signals.

To solve the above problem, the present invention provides a method of compressing the beam width of the antenna pattern of a radar antenna, comprising the steps of: providing a radar antenna system comprising two similar antennas including a monopulse feed system; scanning the antenna system while transmitting radio waves from the two antennas of the antenna system in such a manner that both the radio waves transmitted from the respective antennas are in the same phase; receiving by the antenna system the radio waves which were transmitted from the antenna system and reflected by scattering objects and have finally come back to the antenna system; calculating a double differential coefficient of the sum signal by differentiating twice the sum signal of signals received by said two antennas of the antenna system with respect to the scanning angle; calculating a double differential coefficient of the difference signal by differentiating twice the difference signal of signals received by said two antennas of the antenna system with respect to the scanning angle; and processing an output signal such that said sum signal is output as a final output signal only if the double differential coefficient of said sum signal is equal to or less than a predefined positive real number value and if the double differential coefficient of said difference signal is equal to or greater than a predefined negative real number value, and a zero signal is output in any other cases.

In the present invention, thus, the conditions which should be met for the sum signal to be output as a final output signal has been altered such that the condition that the receiving pattern waveform associated with the sum signal should have an upwardly convex form, that is, its double differential coefficient should be negative has been expanded to the condition that the double differential coefficient should be equal to or less than a predefined positive real number value, and furthermore the condition that the double differential coefficient of the difference signal should be positive is expanded to the condition that it should be equal to or than a predefined negative real number value. This alteration allows an output signal, near an angle at which there is a small scattering object, to be correctly output without being missed. Thus, it becomes possible to obtain an output pattern waveform which represents more faithfully the scattering object distribution. The above-described positive real number value serving as a reference level for the double differential coefficient of the sum signal and the negative real number value serving as a reference level for the double differential coefficient of the difference signal may be determined depending on the types of objects to be detected. For example, these number values may be determined experimentally such that the number values may be optimized for the type of a radar such as a harbor radar, air traffic control radar, etc.

DESCRIPTION OF THE PREFERRED EMBODIMENTS

Figure 6:
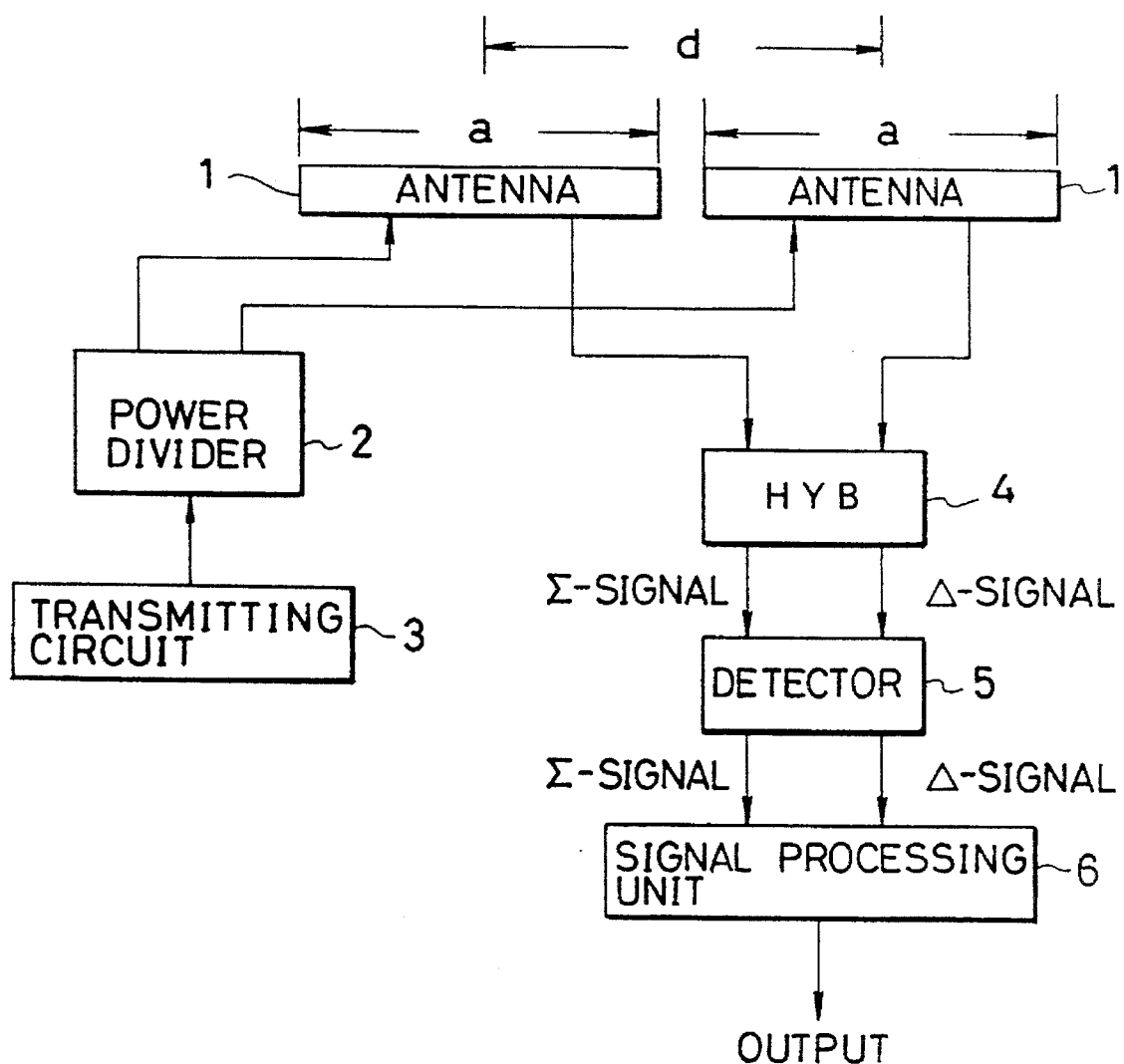
FIG. 6 is a schematic diagram showing a configuration of a radar system for use of explanation on a method of the beam compression of an antenna pattern in a radar system according to an embodiment of the present invention.

Referring to an embodiment, the present invention will be described in more detail below. FIG. 6 is a simplified diagram showing a configuration of a radar system for use of explanation on a method of beam compression in an antenna pattern of a radar system according to one embodiment of the present invention. In FIG. 6, reference numerals 1, 1 designate two transmitting/receiving antennas of an antenna system, each antenna having the same structure such as a horn antenna or an array antenna with a monopulse feed system, wherein each antenna has a length of "a" and wherein the center-to-center distance between the antennas is d. Reference numeral 2 designates a power divider and reference numeral 3 designates a transmitting circuit. The transmitting circuit 3 generates transmission power, which is fed in the same phase to the antennas 1, 1 via the power divider 2. Reference numeral 4 designates a hybrid circuit which produces a sum signal Σ and a difference signal Δ from receiving signals of the two antennas 1, 1. Reference numeral 5 designates a detector, and reference numeral 6 designates a signal processing unit. The signal processing unit 6 performs double differential processing on both sum signal Σ and difference signal Δ detected by the detector 5. If the double differential coefficient of the sum signal Σ is equal to or less than the positive predefined real number value, and if the double differential coefficient of the difference signal Δ is equal to or greater than the negative predefined real number value, the sum signal Σ is output as a final output signal. In any other cases, the signal processing unit 6 provides a zero output signal.

In the radar system configured in the above-described manner, the transmission circuit 3 provides transmission power via the power divider 2 to the antenna system comprising the antennas 1, 1, then the antenna system scans the antenna beam while transmitting radio waves. When the transmitted radio waves have come back after it were reflected by scattering objects, it is received by the antennas 1, 1 and then it is input to the hybrid circuit 4 which in turn provides a sum signal Σ corresponding to a sum signal pattern and also provides a difference signal Δ corresponding to a difference signal pattern. These sum signal Σ and difference signal Δ are detected by the detector 5, and then subjected to the above-described signal processing in the signal processing unit 6 thereby providing an output signal whose beam width is compressed more effectively without missing necessary output signals.

Figure 7:
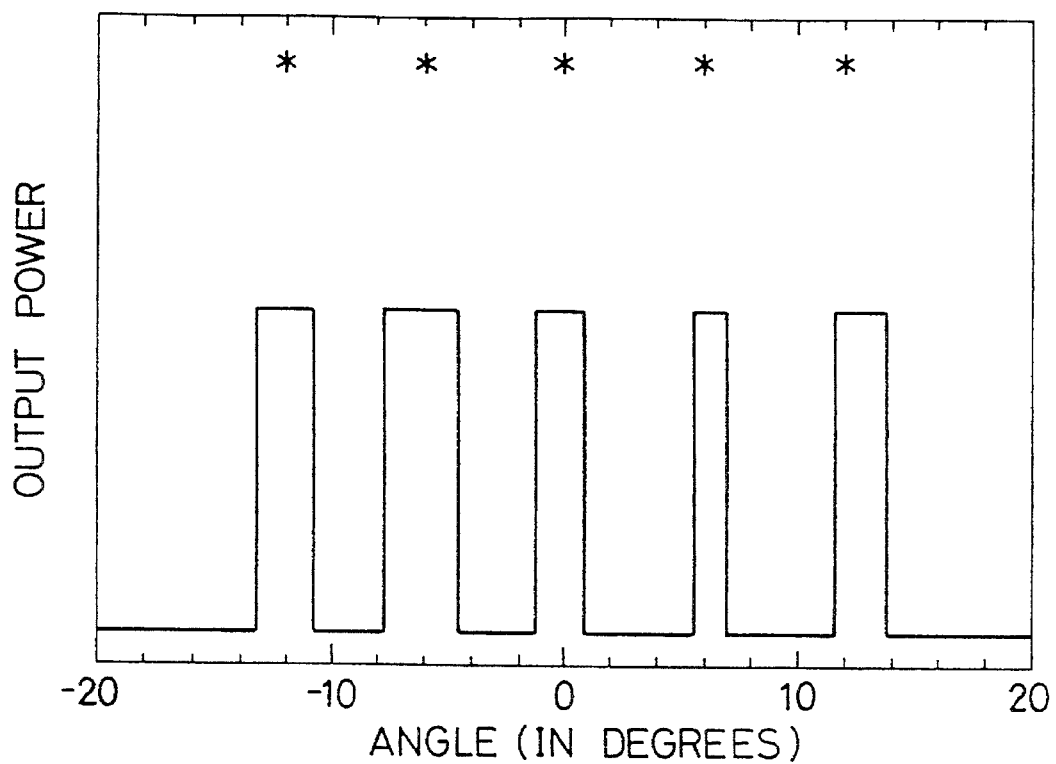
FIG. 7 is a schematic representation of an output power pattern obtained as a result of simulation on the radar system of FIG. 6.

FIG. 7 shows a result of simulation on the radar system shown in FIG. 6 wherein the simulation has been done assuming that the beam is scanned by the antennas 1, 1 configured with uniformly distributed horn antennas whose antenna length is five times the wavelength of the radio wave, wherein the center-to-center distance d is equal to the antenna length a. In this simulation, the sum signal Σ has been assumed to be output as an output signal when the double differential coefficient associated with the sum signal is equal to or less than 0.0607 and the double differential coefficient associated with the difference signal is equal to or greater than 0. A zero output signal has been assumed to be output as an output signal in any other cases.

Figure 1:
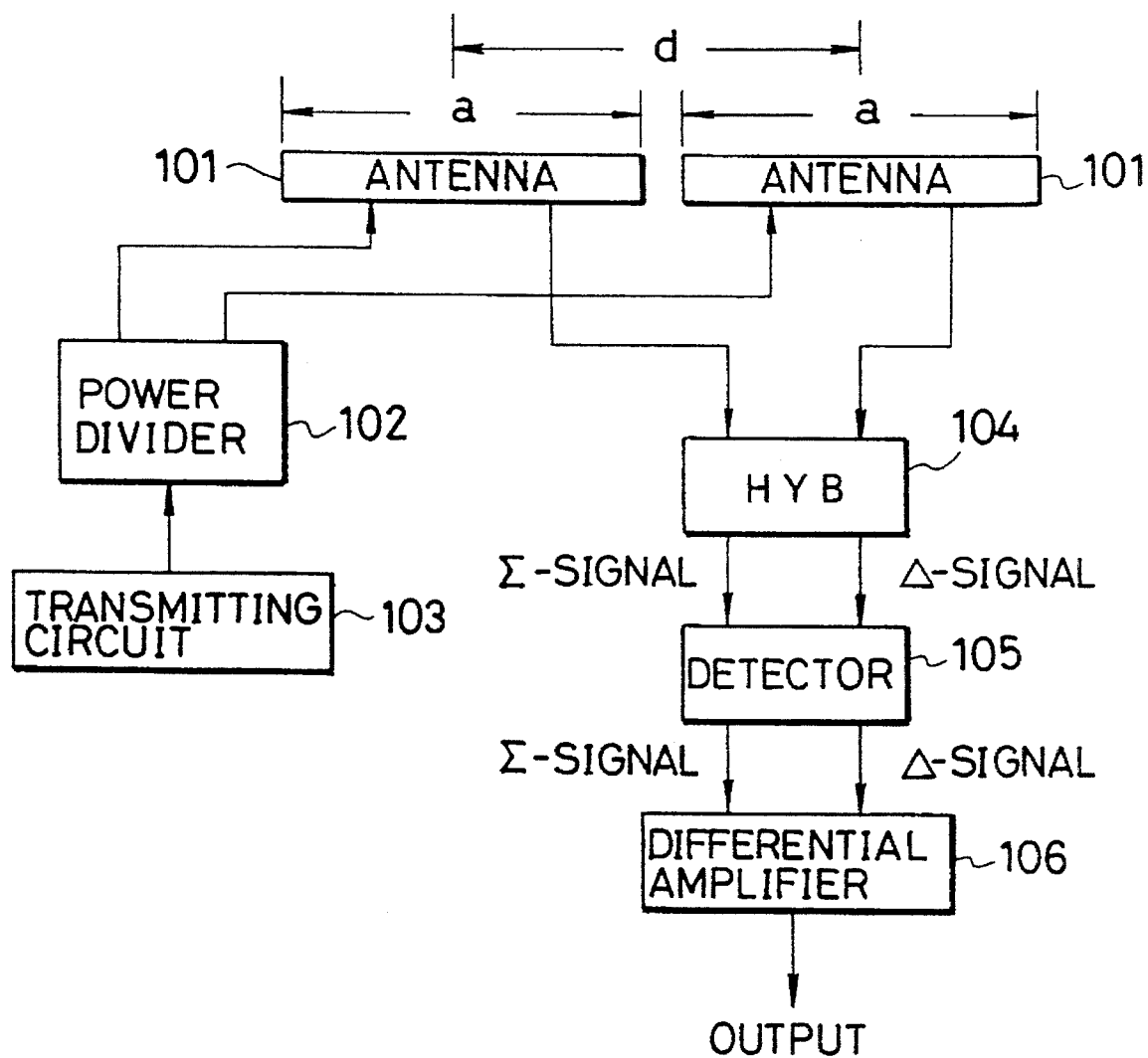
FIG. 1 is a schematic diagram showing a configuration of a conventional radar system.
Figure 2:
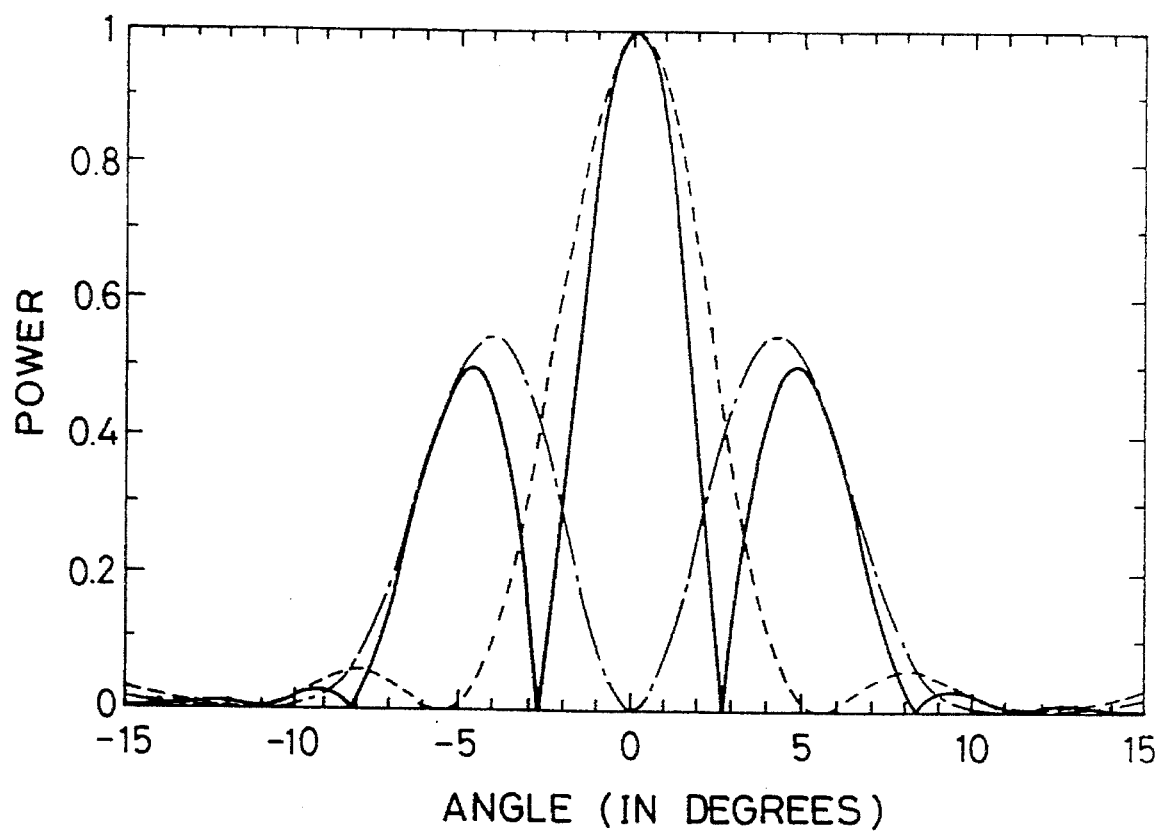
FIG. 2 is a schematic representation of waveforms of a sum signal, a difference signal, and an output signal relating to the beam compression processing in a radar system according to a conventional technique.
Figure 3:
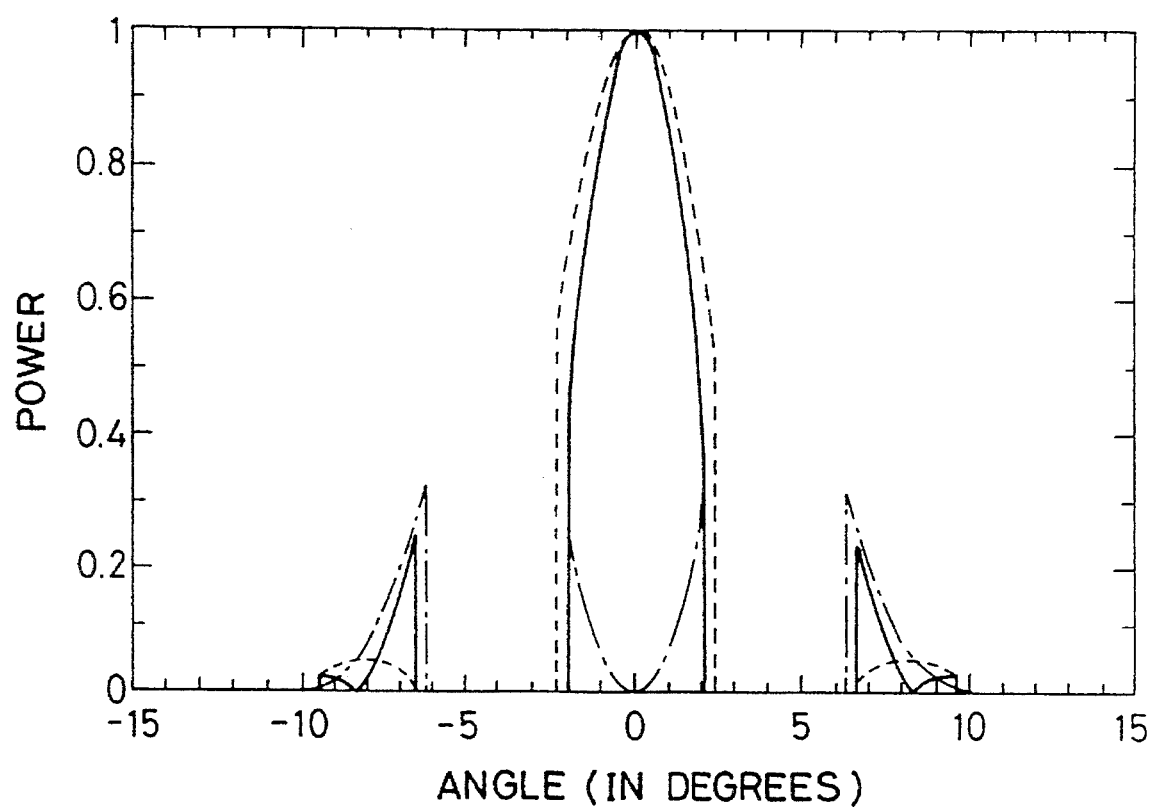
FIG. 3 is a schematic representation of an output signal which is obtained as a result of the beam compression processing according to the previous invention.
Figure 4:
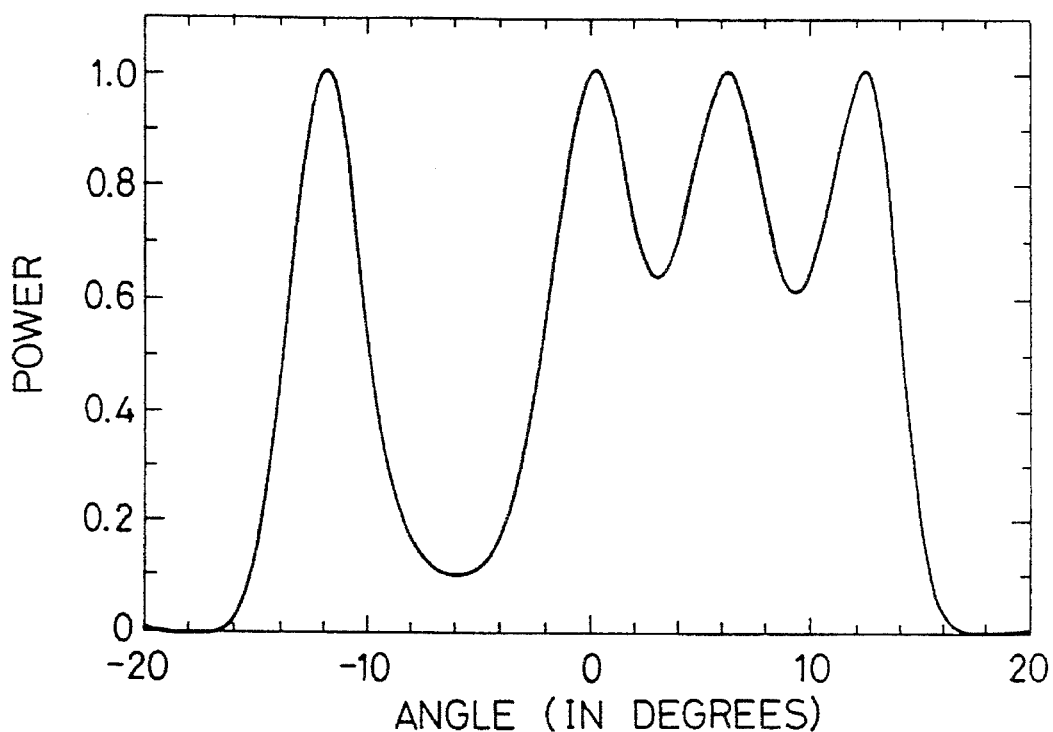
FIG. 4 is a schematic representation of a power pattern of a sum signal which may be obtained when a small scattering object exists near a large scattering object.
Figure 5:
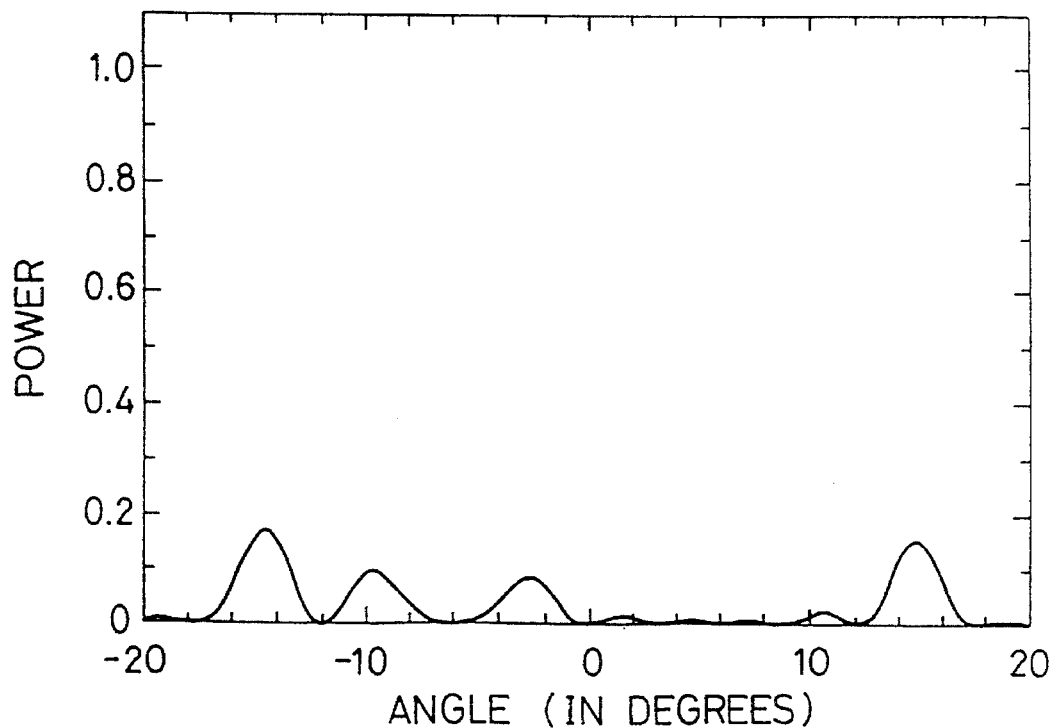
FIG. 5 is a schematic representation of a power pattern of a difference signal which may be obtained when a small scattering object exists near a large scattering object.
Figure 8:
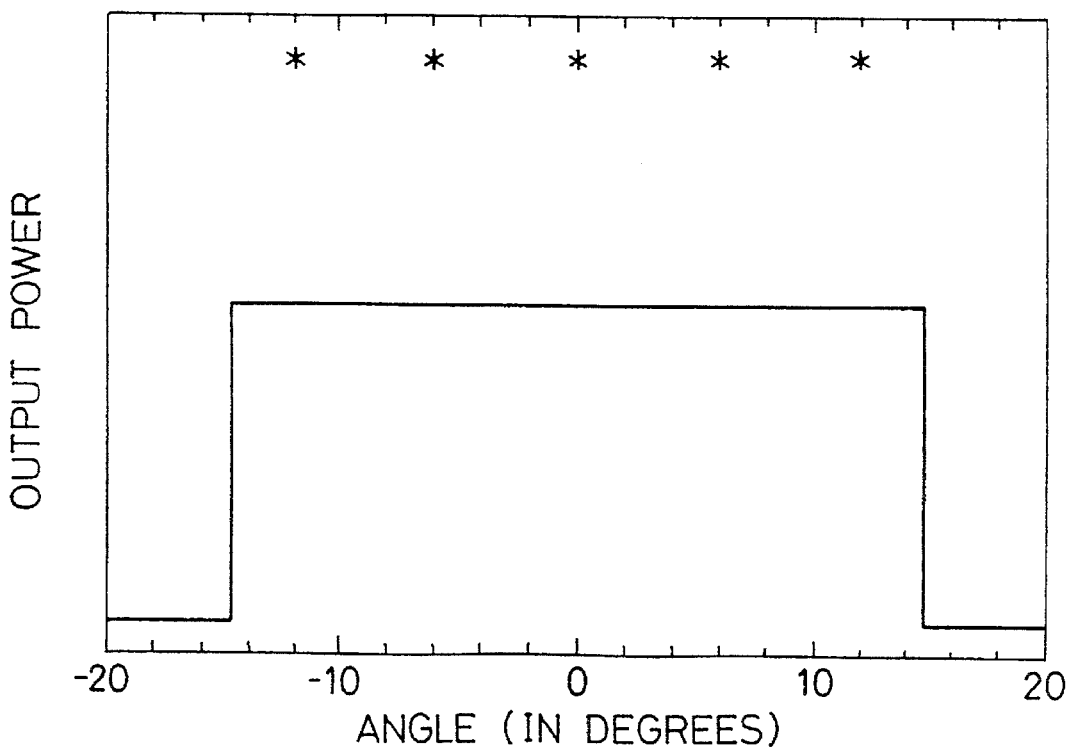
FIG. 8 is a schematic representation of an output power pattern obtained as a result of simulation on a conventional radar system.
Figure 9:
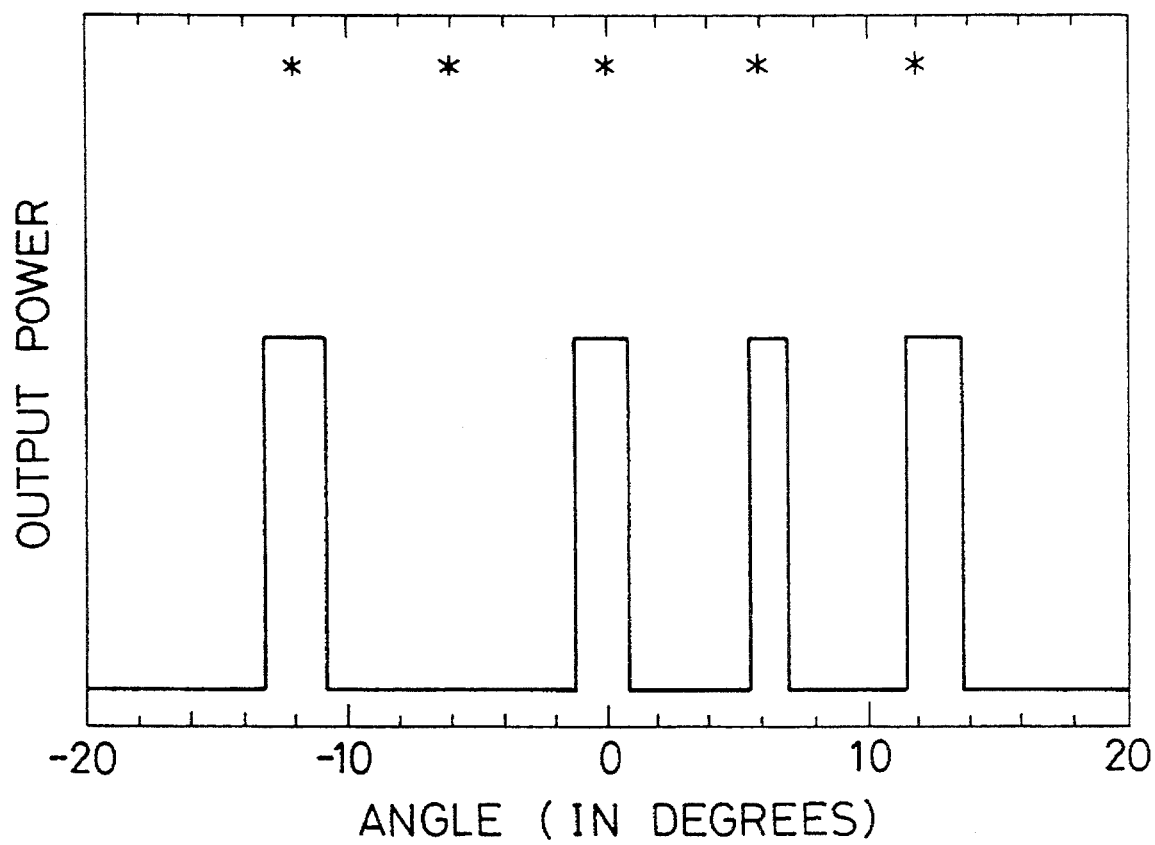
FIG. 9 is a schematic representation of an output power pattern obtained as a result of simulation on a radar system employing the beam-compression method according to the previous invention.

In FIG. 7, there is shown a simulation result with respect to a final output power pattern obtained under the condition that there are point scattering objects in the directions of −12°, −6°, 0°, +6°, and +12° about the rotation axis of the antenna system wherein all the scattering objects exist at the same distance from the antenna system, and wherein the scattering coefficient of the scattering object existing at −6° is 0.1, and the scattering coefficients of the other scattering objects are 1. For comparison to the beam compression method according to the present invention, FIG. 8 shows a simulation result of a final output power pattern for the radar system shown in FIG. 1 using a conventional method of beam compression, and FIG. 9 shows a simulation result of a final output power pattern for a radar system employing the method of beam compression according to the previous invention, that is, U.S. patent application Ser. No. 08/209.901.

In the representations of the simulated power patterns shown in FIGS. 7–9, a "1" is output when the output power is greater than 0.1 relative to the reference value which is set to the maximum output power obtained when there is only one point scattering object, and a "0" or nothing is output in the other cases. In these representations, it is determined that a "1" is output when the output power is greater than 0.1 relative to the reference value, based on the fact that a CRT display of a radar system has a dynamic range of about 10 dB. Marks * shown in the upper portions of FIGS. 7–9 denote the positions of the scattering objects.

As can be seen from FIGS. 7–9, the method of beam compression according to the present invention can provide an effectively compressed final output pattern waveform which represents more faithfully the distribution of scattering objects without missing necessary output signals, even under the conditions where the beam compression method according to the conventional technique or according to the previous invention may result in a final output pattern waveform which has great inconsistency with the distribution of scattering objects.

Figure 10:
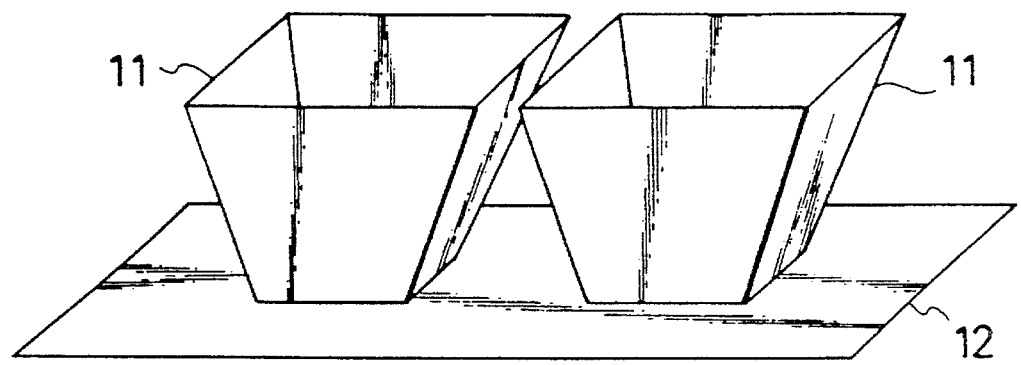
FIG. 10 is a perspective view illustrating a specific configuration of an antenna system of the radar system of FIG. 6.
Figure 11:
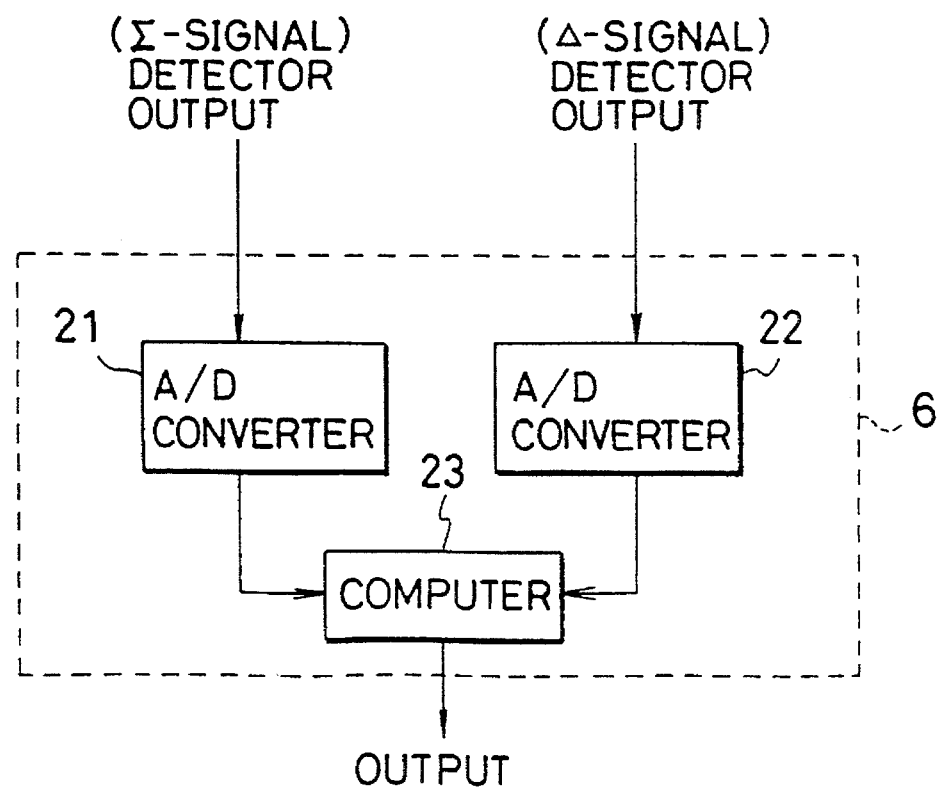
FIG. 11 is a schematic diagram illustrating a specific configuration of a signal processing unit of the radar system of FIG. 6.

FIG. 10 shows a specific example of a configuration of the antenna system of the radar system shown in FIG. 6. In this example, the antenna system comprises horn antennas 11, 11 having the same structure, and an element 12 for supporting the antennas. The signal processing unit 6 shown in FIG. 6 may be configured by using known means or techniques in such a manner that a received signal is converted to a digital signal by an analog-to-digital (A/D) converter, and then a double differential coefficient is calculated and evaluated by a computer. FIG. 11 shows an example of such a configuration. In FIG. 11, reference numerals 21 and 22 designate analog-to-digital (A/D) converters which respectively convert the analog sum signal Σ and the difference signal Δ detected by the detector into digital values, Reference numeral 23 is a computer which calculates the double differential coefficients of the sum signal Σ and the difference signal Δ and further determines whether the values of these double differential coefficients are in the predefined ranges thereby outputting the sum signal Σ or a zero signal.

According to the present invention, as described above referring to the embodiment, the sum signal is output as a final output signal only if the double differential coefficient of the sum signal associated with two antennas is equal or less than the predefined positive real number value and if the double differential coefficient of the difference signal is equal or greater than the predefined negative real number value, and a zero signal is output in any other cases. Thus, the beam width is more effectively compressed, and the final output pattern waveform represents faithfully the distribution of scattering objects without missing necessary output signals.

What is claimed is:

1. A method for compressing a beam width of the antenna pattern of a radar antenna, comprising:

providing a radar antenna system comprising two antennas including a monopulse feed system;

scanning said antenna system while transmitting radio waves from said two antennas of the antenna system in such a manner that both the radio waves transmitted from the respective antennas are in phase;

receiving by the antenna system the radio waves which were transmitted from said antenna system and reflected by scattering objects and have finally come back to said antenna system;

calculating a double differential coefficient of a sum signal by differentiating twice a sum signal of signals received by said two antennas of the antenna system with respect to the scanning angle;

calculating a double differential coefficient of a difference signal by differentiating twice a difference signal of signals received by said two antennas of the antenna system with respect to a scanning angle; and processing an output signal such that said sum signal is output as a final output signal only if the double differential coefficient of said sum signal is equal to or less than a predefined positive real number value and if the double differential coefficient of said difference signal is equal to or greater than a predefined negative real number value, and a zero signal is output in any other cases.

* * * * *